(12) United States Patent
Contreras

(10) Patent No.: US 10,993,415 B2
(45) Date of Patent: May 4, 2021

(54) METHODS OF CONSTRUCTING PET NAIL CLIPPERS

(71) Applicant: KLIPTRIO, LLC, Bradenton, FL (US)

(72) Inventor: Alexandre Contreras, Homestead, FL (US)

( * ) Notice: Subject to any disclaimer, the term of this patent is extended or adjusted under 35 U.S.C. 154(b) by 7 days.

(21) Appl. No.: 16/197,360

(22) Filed: Nov. 21, 2018

(65) Prior Publication Data

US 2019/0133083 A1    May 9, 2019

Related U.S. Application Data

(63) Continuation of application No. 15/443,131, filed on Feb. 27, 2017.

(60) Provisional application No. 62/301,056, filed on Feb. 29, 2016.

(51) Int. Cl.

| A01K 13/00 | (2006.01) |
|---|---|
| A45D 29/02 | (2006.01) |
| B21D 53/00 | (2006.01) |
| A45D 29/04 | (2006.01) |
| A01K 17/00 | (2006.01) |
| A01K 27/00 | (2006.01) |
| B21D 39/00 | (2006.01) |

(52) U.S. Cl.
CPC .......... *A01K 13/003* (2013.01); *A45D 29/02* (2013.01); *A45D 29/04* (2013.01); *B21D 53/00* (2013.01); *A01K 17/00* (2013.01); *A01K 27/007* (2013.01); *A01K 27/008* (2013.01); *B21D 39/00* (2013.01)

(58) Field of Classification Search
CPC .... A01K 17/00; A01K 13/003; A01K 27/007; A01K 27/008; A45D 29/02; A45D 29/04; B21D 53/00; B21D 39/00
See application file for complete search history.

(56) References Cited

U.S. PATENT DOCUMENTS

| 2,436,291 | A | * | 2/1948 | Daniel | ................. B65D 51/24 |
|---|---|---|---|---|---|
| | | | | | 15/257.05 |
| 3,838,507 | A | | 10/1974 | Clark | |
| 3,943,947 | A | * | 3/1976 | Voll | ....................... A45D 29/02 |
| | | | | | 132/73 |
| 4,228,585 | A | | 10/1980 | Nelson | |
| 4,747,842 | A | | 5/1988 | Dietz | |
| 4,750,642 | A | * | 6/1988 | Eckstein | .............. B65D 51/223 |
| | | | | | 222/81 |
| 5,762,027 | A | | 6/1998 | Freund | |
| 6,827,038 | B2 | | 12/2004 | Dunn et al. | |
| 7,137,356 | B2 | | 11/2006 | Huggans | |
| 7,217,001 | B2 | | 5/2007 | Vrsalovic et al. | |
| 7,464,665 | B1 | | 12/2008 | Rogers et al. | |
| 7,621,011 | B2 | | 11/2009 | Smith et al. | |
| D615,254 | S | | 5/2010 | Manheimer, III et al. | |
| 7,874,269 | B2 | | 1/2011 | Dunn et al. | |

(Continued)

*Primary Examiner* — Jermie E Cozart
(74) *Attorney, Agent, or Firm* — Hackler Daghighian Martino & Novak

(57) ABSTRACT

A method of constructing a pet nail clipper is provided. In one embodiment, the method comprises receiving a disposable receptacle filled with a styptic substance. After receiving the receptacle, a sidewall of the disposable receptacle is coupled to an inside edge of an opening in a bracket extending from the pet nail clipper. In preferred embodiments, the receptacle is comprised of a cup and a lid and the lid is made with a rubber or silicone and has an entrance into an interior of the receptacle.

21 Claims, 4 Drawing Sheets

(56) References Cited

U.S. PATENT DOCUMENTS

| | | |
|---|---|---|
| 8,100,088 B2 | 1/2012 | Manheimer, III et al. |
| 8,156,900 B1 | 4/2012 | Gaunt |
| 8,469,039 B2 | 6/2013 | Jackson |
| 8,658,193 B2 | 2/2014 | Greenwald |
| 2004/0163607 A1* | 8/2004 | Dunn .................. A01K 13/00 119/602 |
| 2005/0204563 A1* | 9/2005 | Stender .................. B25F 5/00 30/123 |
| 2005/0229862 A1 | 10/2005 | Dirle et al. |
| 2007/0137041 A1 | 6/2007 | Manheimer et al. |

\* cited by examiner

METHODS OF CONSTRUCTING PET NAIL CLIPPERS

CROSS-REFERENCE TO RELATED APPLICATIONS

This application is a continuation application of U.S. patent application Ser. No. 15/443,131 filed Feb. 27, 2017 which claims the benefit of U.S. provisional application No. 62/301,056 filed Feb. 29, 2016, the contents of both are herein incorporated by reference in their entireties.

BACKGROUND OF THE INVENTION

The present invention relates to a pet nail clipper and, more particularly, to a pet nail clipper with a deburring plate and a styptic receptacle.

Pets have either nails or claws that enable them to climb, defend themselves and catch prey. Since most pets, such as dogs, cats, birds, and other small critters do not use nails or claws like they do in the wild, their nails or claws continue to grow. A groomer or owner of the pet must regularly inspect and trim the nails or claws. Overgrown nails can cause damage to the skin and personal belongings of the pet owner. Also, long nails can curl around if left unattended and lead to a painful embedded Therefore, nails need to be cut and filed. If the nail begins to bleed, the nail may be submerged in a styptic material.

As can be seen, there is a need for a pet nail clipper that clips nails, files nails and readily provides a styptic material.

SUMMARY OF THE EMBODIMENTS

In one aspect of the present invention, a pet nail clipper comprises: an upper arm comprising a handle portion and a cutting portion comprising a blade; a lower arm comprising a handle portion and a cutting portion comprising a blade; a pivot bolt pivotally attaching the upper arm and the lower arm together in between the handle portions and the cutting portions; a receptacle bracket laterally extending from at least one of the upper arm and the lower arm; and a receptacle secured within the receptacle bracket.

In another aspect of the present invention, a pet nail clipper comprises: an upper arm comprising a handle portion and a cutting portion comprising a blade; a lower arm comprising a handle portion and a cutting portion comprising a blade; a pivot bolt pivotally attaching the upper arm and the lower arm together in between the handle portions and the cutting portions; and a deburring plate secured to at least one of the upper arm and the lower arm.

These and other features, aspects and advantages of the present invention will become better understood with reference to the following drawings, description and claims.

DETAILED DESCRIPTION OF THE PREFERRED EMBODIMENTS

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention provides for a convenient way of clipping a dog, cat or any small animal's nails, filing the nails and stopping the nail from hemorrhaging if needed. The present invention may include a first handle with an integrated stainless steel file used to shave down the nail. The present invention may further include stainless steel blades used to cut nails. A second handle may include a loop that retains a disposable styptic powder cartridge. A bolt and screw may pivotally connect both handles and blades together. A spring biases the handles and blades apart. A disposable styptic powder cartridge is secured within the loop. A locking latch may be used to close clippers when not in use. A thin rubber silicone cap may be secured to the cartridge. A thin foil may be disposed under the rubber silicone cap.

To use the invention, grab the clippers with one hand. By squeezing the handles together, the stainless-steel blades cut the nails. Once the nails are cut, use the integrated stainless-steel file to trim down burrs left behind from cutting the nails. The spring allows the blades to reset to be used again. If the nail happens to hemorrhage, use the disposable styptic cartridge to stop the bleeding. Penetrate the rubber silicone cap with the nail to get passed the thin foil and into the cup that holds the styptic powder. Allow the nail to sit in powder for a few minutes to stop the bleeding.

Figure 1:
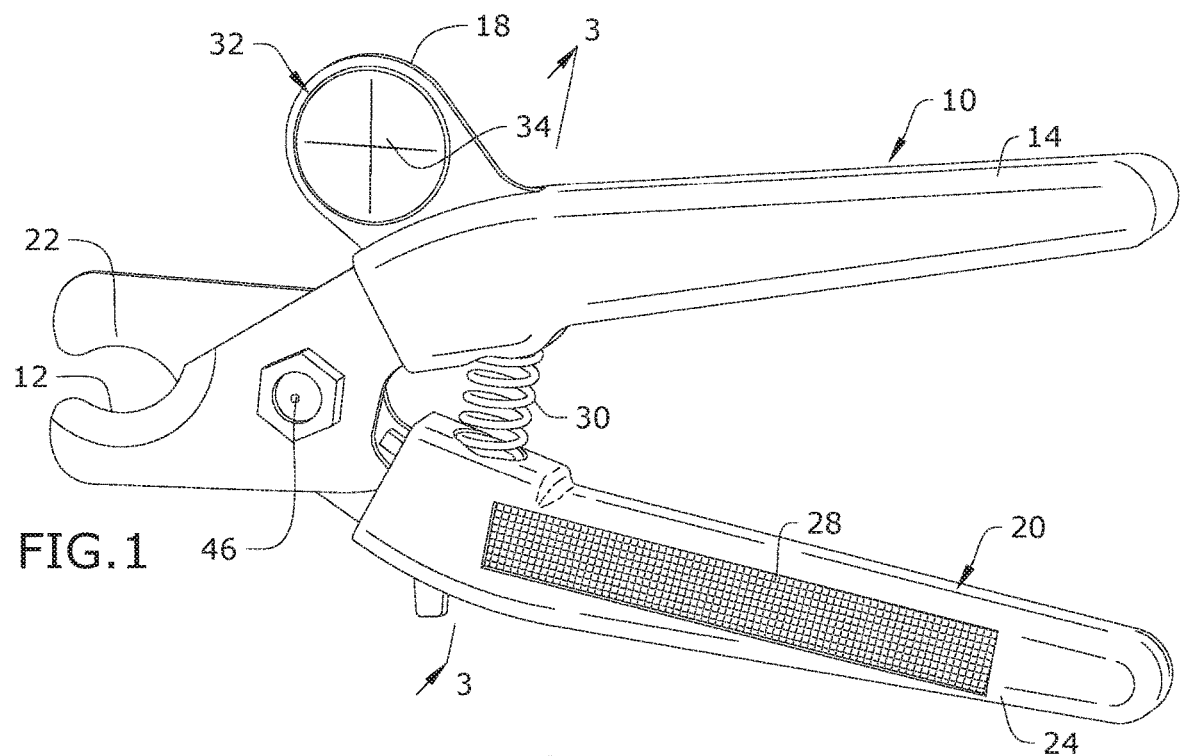
FIG. 1 is a perspective view of an embodiment of the present invention shown in an expanded configuration.
Figure 2:
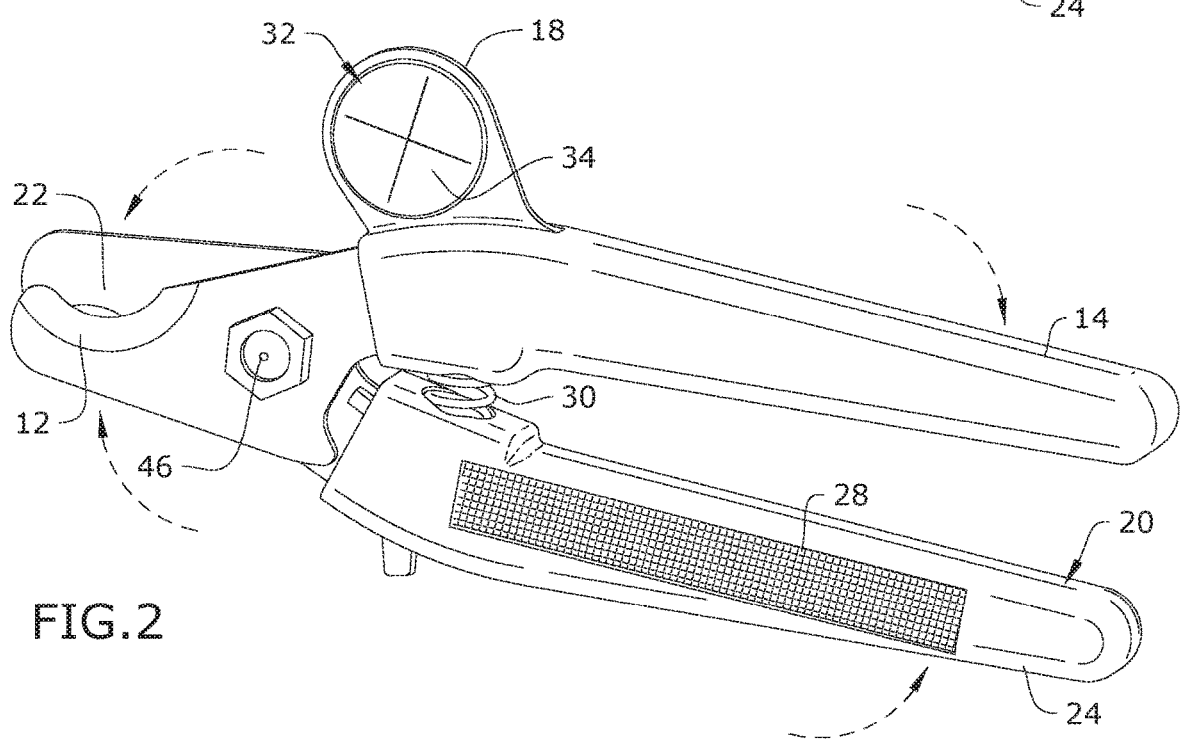
FIG. 2 is a perspective view of an embodiment of the present invention shown in a contracted configuration.
Figure 3:
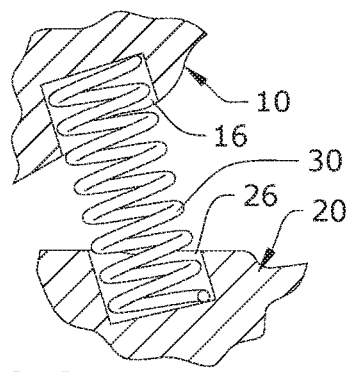
FIG. 3 is a section detail view of the present invention taken along line 3-3 in FIG. 1.
Figure 5:
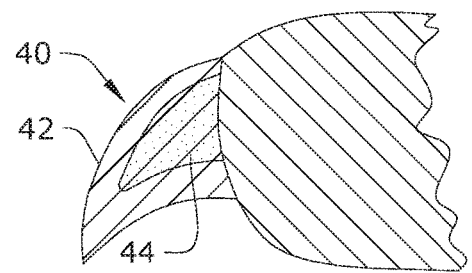
FIG. 5 is a section view of an uncut nail.
Figure 4:
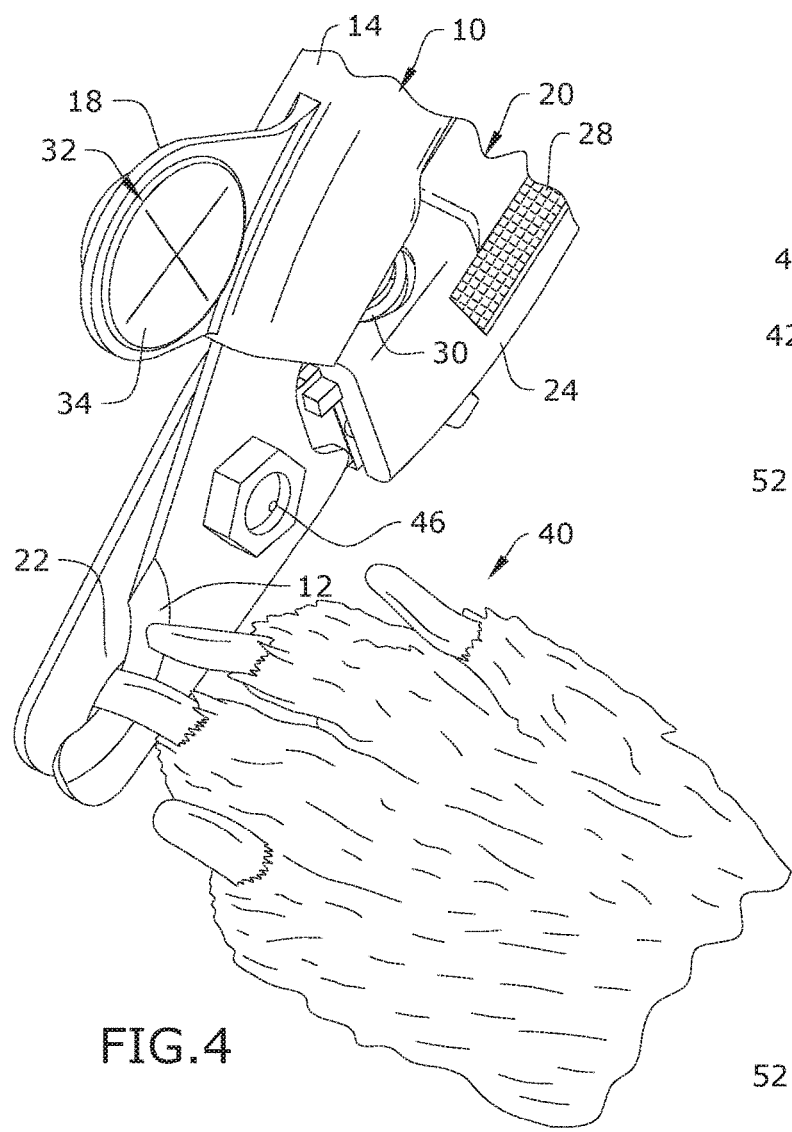
FIG. 4 is a perspective view of an embodiment of the present invention shown in use.
Figure 6:
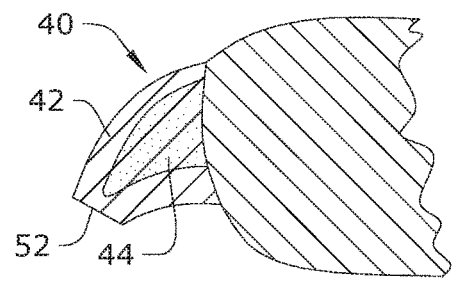
FIG. 6 is a section view of a cut nail.
Figure 7:
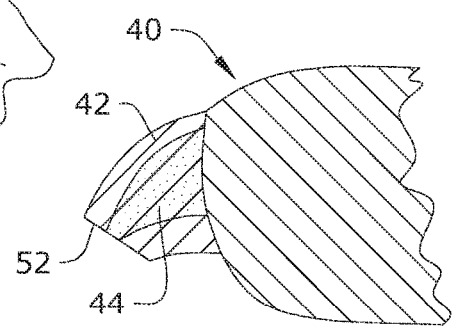
FIG. 7 is a section view of a cut quick.
Figure 8:
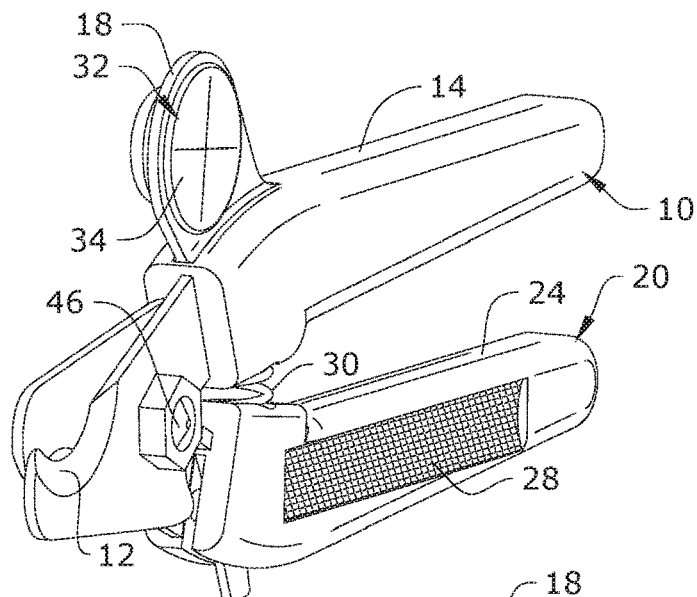
FIG. 8 is a perspective view of an embodiment of the present invention.
Figure 9:
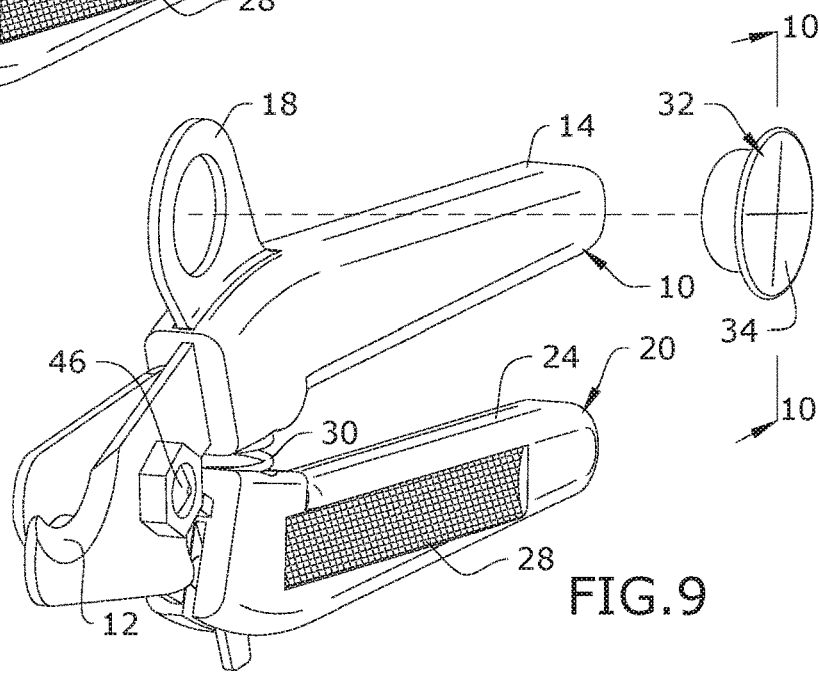
FIG. 9 is an exploded view of an embodiment of the present invention.
Figures 10, 11:
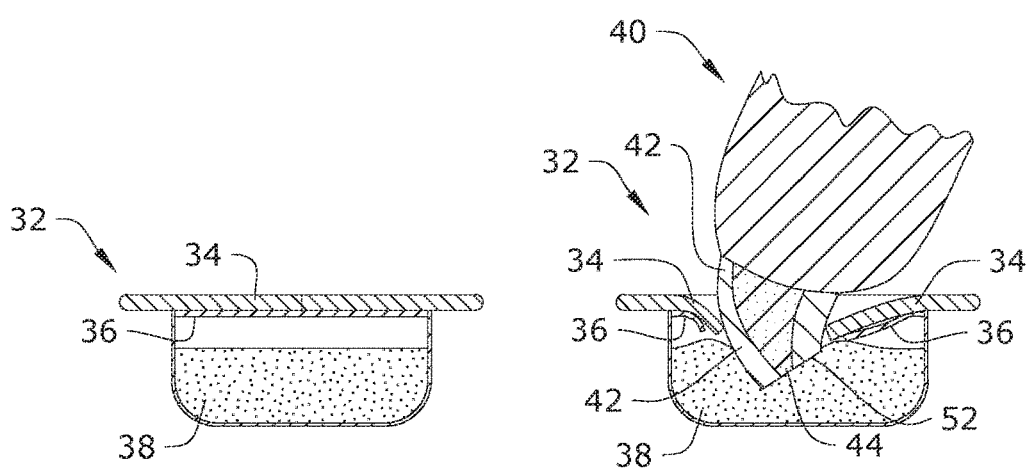
FIG. 10 is a section detail view of the present invention taken along line 10-10 in FIG. 9.
FIG. 11 is a section detail view of an embodiment of the present invention shown in use.
Figure 12:
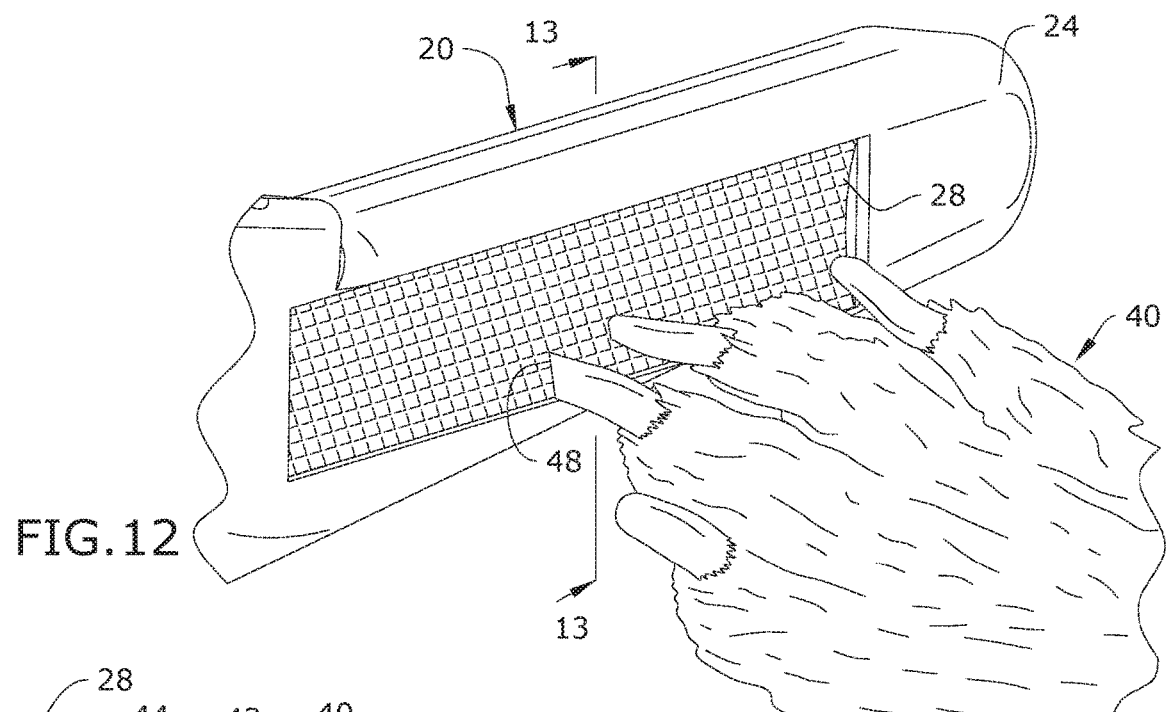
FIG. 12 is a perspective detail view of an embodiment of the present invention shown in use.
Figure 13:
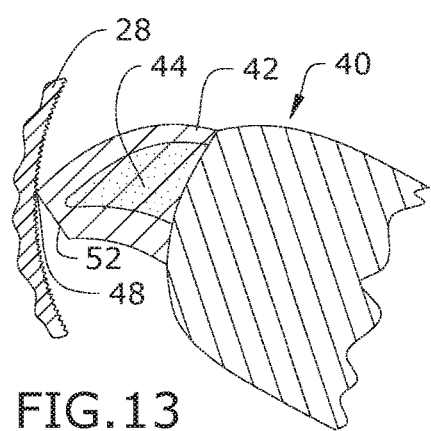
FIG. 13 is a section view of the present invention taken along line 13-13 in FIG. 12.
Figure 15:
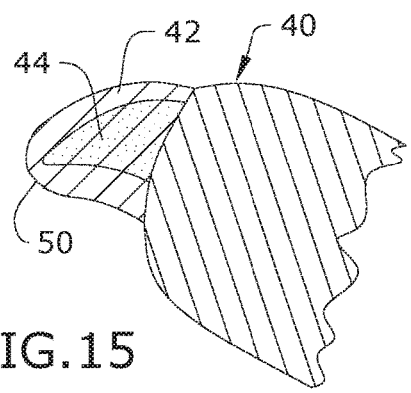
FIG. 15 is a section detail view of a paw and nail after using the present invention.
Figure 14:
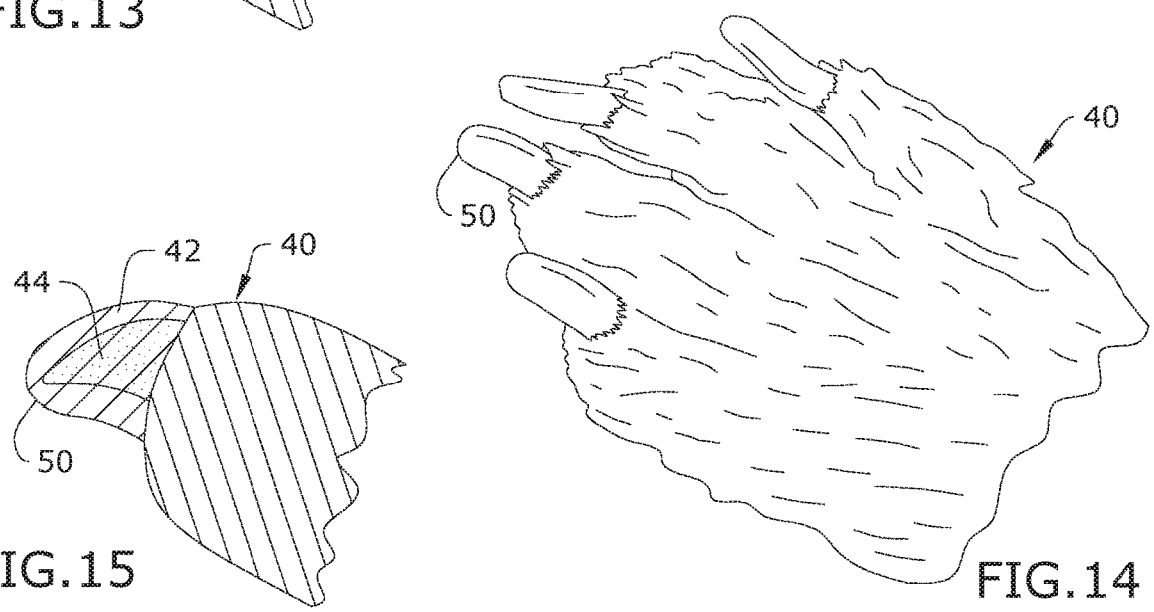
FIG. 14 is a perspective view of a paw and nails after using the present invention.

Referring to FIGS. 1 through 15, the present invention includes a pet nail clipper. The pet nail clipper includes an upper arm 10 and a lower arm 20. The upper arm 10 includes a handle portion 14 and a cutting portion 12 having a blade. The lower arm 20 also includes a handle portion 24 and a cutting portion 22 having a blade. A pivot bolt 46 pivotally connects the upper arm 10 and the lower arm 20 together in between the handle portions 14, 24 and the cutting portions 12, 22. A spring 30 is attached to the upper arm 10 and the lower arm 20. The spring 30 may fit within an upper cavity 16 formed on an underside of the upper arm 10 and a lower cavity 26 formed on an underside of the lower arm 20. The spring 30 biases the handle portions 14, 24 away from one another and biases the cutting portions 12, 22 away from one another. A user may place the cutting portions 12, 22 over a tip of the nail 40, squeeze the handle portions 14, 24 together, and cut the nail 40 to form a flat surface 52.

The pet nail clippers may further retain a receptacle 32. The receptacle 32 may house styptic liquid or powder 38. In such embodiments, a receptacle bracket 18 extends laterally from at least one of the upper arm 10 and the lower arm 20. For example, the receptacle bracket 18 may extend laterally from the handle portion 14 of the upper arm 10. The receptacle bracket 18 may include a plate with a looped inner edge forming an opening. The receptacle 32 may include a rounded sidewall that fits within and releasably retains to the receptacle bracket 18. In certain embodiments, a lid 34 may be secured to an upper edge of the sidewall of the receptacle 32. The lid 34 may be made of a material having a rubber elasticity, such as silicone, rubber and the like. At least one slit, such as crisscrossing slits, may be formed through the lid 34. A seal 36 may cover the receptacle underneath the lid prior to use. If a quick 44 is cut, the groomer may easily place the nail casing 42 of the nail 40 through the slits and into the styptic liquid or powder 38, which stops the bleeding.

In certain embodiments, the present invention further includes a deburring plate 28. The deburring plate 28 is secured to at least one of the upper arm 10 and the lower arm 20. For example, the deburring plate 28 may be secured to the handle portion 24 of the lower arm 20. The deburring plate 28 may include a metal plate having an inner surface secured to the handle portion 24 and an outer abrasive or course surface. After the nail 40 has been clipped, the groomer may grind an edge 48 of the outer casing 42 of the nail 40 to further smoothen and round the nail 50.

It should be understood, of course, that the foregoing relates to exemplary embodiments of the invention and that modifications may be made without departing from the spirit and scope of the invention as set forth in the following claims.

What is claimed is:

1. A method of constructing a pet nail clipper comprising:
   receiving a receptacle filled with a styptic substance; and
   coupling the receptacle to an inner edge of an opening formed in a bracket extending laterally from a first arm of the pet nail clipper, wherein the bracket is a plate and the opening has a central axis that is perpendicular to a plane formed by the first arm, the bracket and a second arm of the pet nail clipper and the receptacle is releasably secured within the inner edge.

2. The method of claim 1, wherein the receptacle comprises a cup and a lid and the lid is secured at an upper edge of a sidewall of the cup.

3. The method of claim 1, wherein the receptacle includes at least one entrance.

4. The method of claim 3, wherein the entrance is a slit.

5. The method of claim 3, wherein the entrance is comprised of two slits that cross to form the entrance.

6. The method of claim 3, wherein the entrance is located in a portion of the receptacle with rubber elasticity.

7. The method of claim 6, wherein the portion of the receptacle with rubber elasticity is a lid.

8. The method of claim 6, wherein the portion of the receptacle with rubber elasticity is made from rubber or silicone.

9. The method of claim 1, wherein the bracket has an opening with a shape that matches an outside edge of the receptacle.

10. The method of claim 9, wherein the receptacle is releasably secured within an inner edge of the opening in the bracket.

11. The method of claim 1, wherein the bracket is laterally extending from a handle portion of the first arm of the pet nail clipper.

12. The method of claim 1, wherein the receptacle is designed to be disposable.

13. The method of claim 1, wherein the plate has a looped inner edge forming the opening.

14. The method of claim 1, wherein the receptacle is a disposable cartridge.

15. The method of claim 1, wherein the styptic substance is a liquid or powder.

16. The method of claim 1, wherein the receptacle is sealed with a seal prior to use.

17. The method of claim 16, wherein the seal is a piece of foil.

18. A method of constructing a pet nail clipper comprising:
   receiving a disposable receptacle filled with a styptic liquid or powder; and
   coupling the receptacle to an inner edge of an opening formed in a bracket extending laterally from a first arm or a second arm of the pet nail clipper, wherein the bracket is a plate and the opening has a central axis that is perpendicular to a plane formed by the first arm, the bracket and the second arm of the pet nail clipper and the receptacle is releasably secured within the inner edge;
   wherein the receptacle is comprised of a cup and a lid and the lid is made with a rubber elasticity and has a pair of slits that cross to form an entrance into an interior of the receptacle.

19. A method of constructing a pet nail clipper comprising:
   receiving a disposable receptacle filled with a styptic substance; and
   coupling a sidewall of the disposable receptacle to an inside edge of an opening in a bracket extending laterally from the pet nail clipper wherein the bracket is a plate and the opening has a central axis that is perpendicular to a plane formed by a first arm, the bracket and a second arm of the pet nail clipper;
   wherein the receptacle is comprised of a cup and a lid and the lid is made with a rubber or silicone and has an entrance into an interior of the receptacle.

20. The method of claim 19, wherein the styptic substance is a liquid or powder.

21. The method of claim 20, wherein the bracket extends laterally from
   a handle portion of the first arm of the pet nail clipper.

* * * * *